United States Patent Office 3,164,533
Patented Jan. 5, 1965

3,164,533
PRODUCTION OF *MYCOBACTERIUM PHLEI*
Donald Paul Kronish, Bronx, N.Y., and Raam R. Mohan, Randolph Township, Dover, N.J., assignors to Warner-Lambert Pharmaceutical Company, Morris Plains, N.J., a corporation of Delaware
No Drawing. Filed Feb. 25, 1963, Ser. No. 260,851
3 Claims. (Cl. 195—96)

This invention is concerned with improvements in or relating to the growth and production of *Mycobacterium phlei*.

*Mycobacterium phlei* is an aerobic acid-fast bacillus from which certain components or fragments capable of simulating the reticulo-endothelial system have been isolated. In copending application Serial No. 189,696 is described a stationary surface culture technique which, while quite satisfactory, is more suited to the production of *M. phlei* where only production on a somewhat limited scale is desired.

We have now found, however, that by employing certain process conditions hereinafter described in greater detail, it is possible to grow *M. phlei* by submerged culture techniques and on a scale suitable for commercial production. In addition, by means of the present invention we are able to accomplish the growth of cultures of *M. phlei* in a shorter period and with a substantial increase in yield of whole cells. Indeed, highly beneficial results in the productivity of the active components are achieved. In principle, to enable *M. phlei* to be propagated by submerged or deep aerobic culture, the medium must contain an excess of assimilable sources of carbon and nitrogen and an excess of oxygen. In addition, the culture medium should be controlled to maintain a surface tension of about 40 to 50 dynes so that no pellicle formation occurs during the growth period.

In accordance with this invention, therefore, we provide a process for the production of *M. phlei* by the submerged aerobic culture of *M. phlei* in a nutrient medium in which the assimilable nitrogen in said medium is provided by at least one complex source of nitrogen, and in addition thereto either ammonia or an ammonium salt. The assimilable carbon in our culture medium is provided by a lower polyhydric alcohol.

The complex organic nitrogen source material may, for example, be of the type commonly used in fermentation technology, such as casein, pancreatic-digested casein, buttermilk, whey powder, and the like. In general, we find that pancreatic-digested casein is the preferred complex source of nitrogen.

The ammonium salt should, of course, be one wherein the anion is nontoxic to the growth of *M. phlei*. Suitable salts are, for example, ammonium chloride, ammonium sulfate, ammonium nitrate, and the like. Ammonium citrate is especially advantageous for use in the process of this invention. In place of ammonia or an ammonium salt one can utilize substances which in the medium yield ammonia or an ammonium salt. Such a substance is, for example, citric acid which is converted at least in part to ammonium citrate upon adjusting the pH of the culture medium with ammonium hydroxide.

The relative proportions of the two types of nitrogen sources can vary. In general, it is preferable to have the complex nitrogen source as the major source of nitrogen. For example, a culture medium which contains about 0.5% to 1% of casein is particularly advantageous. The ammonium salts supply the initial source of easily assimilable nitrogen until the organism can utilize the complex nitrogen source and a medium containing a concentration of about 0.25% to 0.5% of these salts is quite suitable.

The preferred source of assimilable carbon for use in the process of this invention is glycerol. Other assimilable carbon sources which may also be used include, for example, glucose, mannose, starch, and the like. In general, the medium should be rich in assimilable carbon. A medium containing, for example, about 4 to 6% of glycerol is quite satisfactory.

It is also advantageous to include in the medium at least one assimilable source of sulfur for which purpose sulfates, thiosulfates and the like may be used. Preferred substances are, for example, magnesium or calcium sulfates. A medium, for example, containing about 0.05 to 0.1% of magnesium sulfate is particularly advantageous.

It is further advantageous to include assimilable water-soluble phosphates for which alkali metal phosphates, e.g., di-potassium phosphate may be used. Thus, a concentration of about 0.05 to 0.1% of di-potassium phosphate in the final medium is quite satisfactory for this purpose.

Trace amounts of metallic ion essential for enzyme formation such as ferric ion may be conveniently included in the medium as ferric sulfate or as ferric ammonium citrate.

In conducting the culture, it is advantageous to have an abundant supply of air and this may be conveniently arranged by bubbling sterile air into the culture medium.

Since *M. phlei* ordinarily forms a pellicle during its growth and this pellicle tends to decrease the yield of the cells, it is particularly important that pellicle formation should be avoided. We have found that this can be accomplished by keeping the medium at a surface tension of about 40 to 50 dynes/cm. Such a surface tension can be advantageously maintained in the medium by including in said medium an organopolysiloxane of the formula:

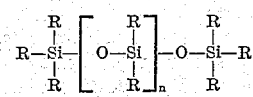

wherein R is methyl and $n$ is an integer of 1 to 1000. The product marketed an "Antifoam C" (Dow-Corning) which contains dimethylpolysiloxane is quite suitable for this purpose. Other agents which can effectively maintain the surface tension at this level can also be included. We prefer to employ a concentration of about 0.01% by weight of "Antifoam C" in the culture medium and more can be added during the actual propagation to maintain the optimum surface tension and avoid pellicle formation.

In addition to the particular conditions referred to herein, the submerged culture is conveniently carried out in accordance with general fermentation practice. Thus, the organism is preferably introduced into the final production medium as a 48–72 hours' old broth culture. The amount of broth culture added to the culture medium at the start of the fermentation will be from about 1 to about 4% of the culture medium. The rate of stirring and rate of aeration in the medium for optimum results will vary according to the shape and the size of the vessel used. We have, for example, found that with a culture medium of a volume of 10 liters contained in a fermentation vessel such as that described Example 2 and employing the stirring means at a speed of 200–250 r.p.m., sufficient oxygen is provided for said aerobic culture by the passage of 2 liters of air per minute through the medium.

The following examples are included in order further to illustrate the invention.

EXAMPLE 1

Preparation of Inoculum

A loopful of *M. phlei* maintained on Sauton's agar slant is inoculated into a flask containing 100 ml. of a sterile medium of the following composition which is referred to hereinafter as Medium A:

| | | |
|---|---|---|
| Casein (pancreatic-digested) | gm | 0.63 |
| Citric acid | gm | 0.200 |
| $K_2HPO_4$ | gm | 0.050 |
| $MgSO_4$ | gm | 0.050 |
| Ferric ammonium citrate | gm | 0.005 |
| Glycerol | ml | 6 |
| Tap water to make | ml | 100 |

The pH of the above composition is adjusted to 7.2 by addition of $NH_4OH$. The inoculated medium is then shaken at 37° C. on a rotary shaker at 180–200 r.p.m. for 72 hours. 10 ml. of this culture is then subcultured into 400 ml. of sterile Medium A. The subculture is again incubated at 37° C. for 72 hours.

EXAMPLE 2

Submerged Aerobic Culture of M. phlei 400 ml. of the culture obtained in accordance with Example 1 are charged aseptically into a 14 liter fermentor (New Brunswick Scientific Co. #F14) containing 10 liters of sterile Medium A. The charged fermentor is then incubated at 37° C. for 7 days with agitation and aeration. Agitation is achieved through two four-blade impellers mounted on a central shaft in the fermentor. One impeller is positioned approximately 2.0 cm. above the source of the aeration at the bottom of the fermentation vessel. The second impeller is positioned so that it is about 2.0 cm. below the surface of the medium. They are rotated continuously at about 250 r.p.m. during growth of *M. phlei*. Air is introduced into the system through an air inlet located at the bottom of the flask at a rate of about 2 liters per minute. Air is sterilized prior to introduction into the medium by filtration through a sterile air filter comprising an 8 inch by 1 inch steel tube packed with alternate layers of glass and nonabsorbent cotton. About 100 ml. of a 1 to 10 aqueous suspension of "Antifoam C" are added during the course of fermentation. The volume in the fermentor is maintained at 10 liters by the use of a condensing flask through which any condensate is returned to the fermentor. The yield is from about 400 to 500 grams of whole wet intact cells of *M. phlei* containing 75–80% of moisture.

It is understood that the foregoing detailed description is given merely by way of illustration and that many variations may be made therein without departing from the spirit of our invention.

Having described our invention, what we desire to secure by Letters Patent is:

1. Process for the production of *M. phlei* by submerged aerobic culture, which comprises inoculating a vegetative inoculum of said *M. phlei* into a sterile medium containing at least one ammonium salt together with assimilable sources of carbon, complex organic nitrogen and also sulfate, phosphate, and ferric ions, maintaining the surface tension of said medium at about 40 to 50 dynes/cm. by the addition of an organo-polysiloxane of the formula:

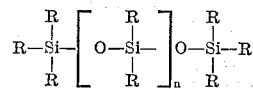

wherein R is methyl and *n* is an integer of 1 to 1000 and allowing the culture to grow at 37° C. under agitation and aeration.

2. Process in accordance with claim 1 wherein said assimilable source of complex organic nitrogen is a member selected from the group consisting of casein, pancreatic-digested casein and whey powder.

3. Process in accordance wtih claim 1 wherein said assimilable source of carbon is glycerol.

References Cited in the file of this patent

UNITED STATES PATENTS 2,756,176      Maurer et al.      July 24, 1946

OTHER REFERENCES

Zinsser: Bacteriology 11th Edition, published by Appleton-Century-Crofts, Inc., New York, 1957, pp. 338–340.

Levine: A Compilation of Culture Media for the Cultivation of Microorganisms, The Williams and Wilkins Co., Baltimore, Md., June 1930, pp. 43, 140, 427, and 649.

King et al.: Journal of General Microbiology, September 1948, pages 315–324.